United States Patent [19]

Foster

[11] Patent Number: 4,745,571
[45] Date of Patent: May 17, 1988

[54] MODULAR ELECTRONIC TEMPERATURE CONTROLLER

[75] Inventor: Joseph F. Foster, Fairport, N.Y.

[73] Assignee: Qualitrol Corporation, Fairport, N.Y.

[21] Appl. No.: 772,133

[22] Filed: Aug. 30, 1985

[51] Int. Cl.[4] ............... G01K 17/20; G01K 1/12; G06F 15/56

[52] U.S. Cl. ............... 364/557; 364/571; 361/37; 374/152; 340/646

[58] Field of Search ............... 364/557, 571; 324/55; 340/646, 648; 361/36, 37158, 24, 25, 26, 27, 35, 38; 374/152

[56] References Cited

U.S. PATENT DOCUMENTS 3,849,705  11/1974  McElroy ............... 361/36
4,623,265  11/1986  Poyser ............... 361/37

OTHER PUBLICATIONS

C. F. Book, Electrical Engineering, 1/52, p. 82, vol. 71.

Primary Examiner—Parshotam S. Lall
Assistant Examiner—David C. Goldman
Attorney, Agent, or Firm—Charles L. Johnson, Jr.

[57] ABSTRACT

A method and system for controlling the temperature of liquid cooled power transformers. The winding temperature of a transformer winding is electronically computed from the actual top oil temperature and the incremental additional temperature resulting from transformer load current. One curve from a family of curves representing the incremental temperature for various transformers may be selected or calibrated by adjustments made which simulate the incremental additional temperature which results from transformer winding current. The total temperature value resulting from the addition of both the top oil temperature and the incremental temperature are used to control indicators, cooling fans, circuit trips and retain an indication of the highest temperature occuring during the time period of interest.

11 Claims, 10 Drawing Sheets

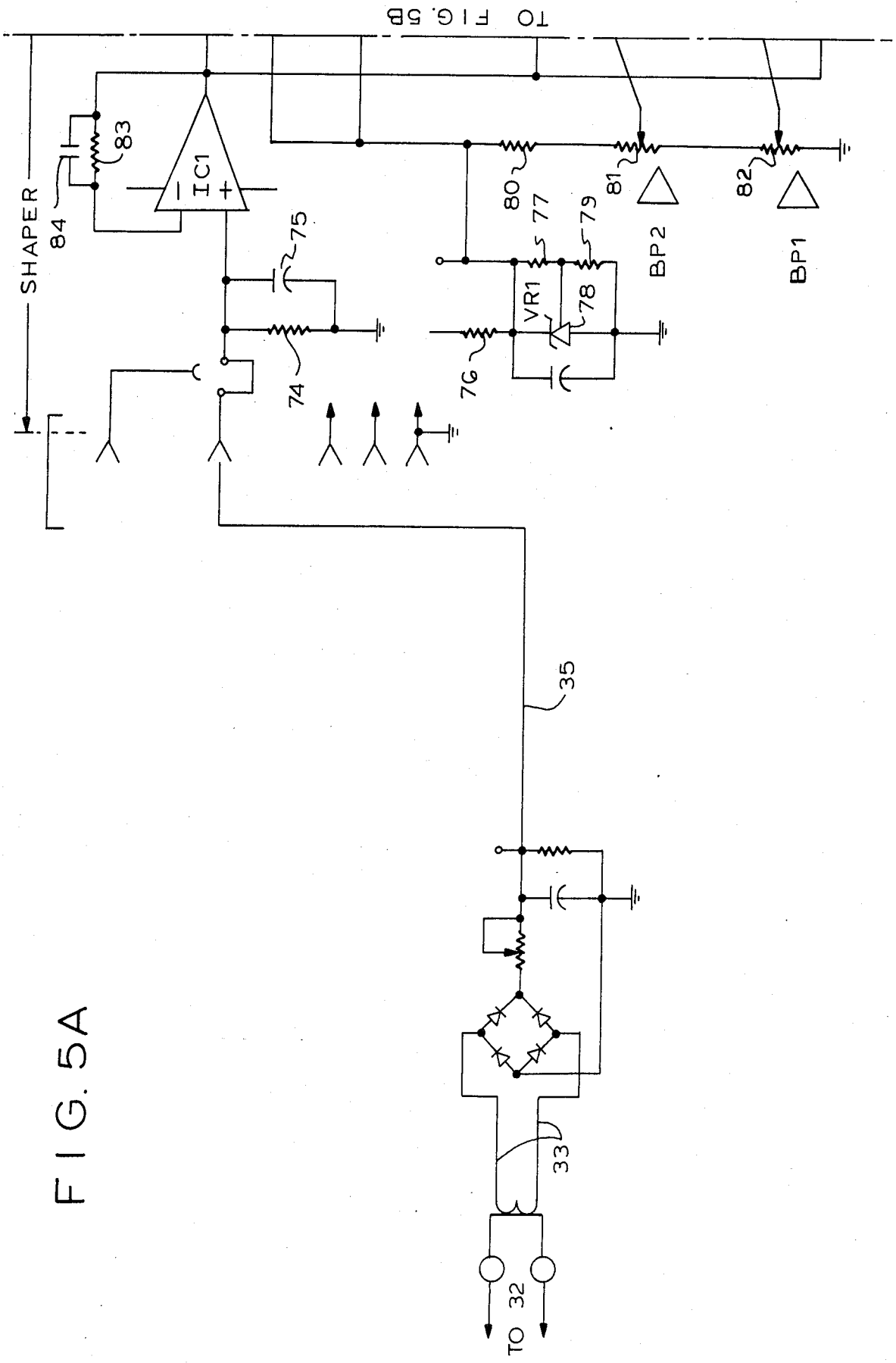

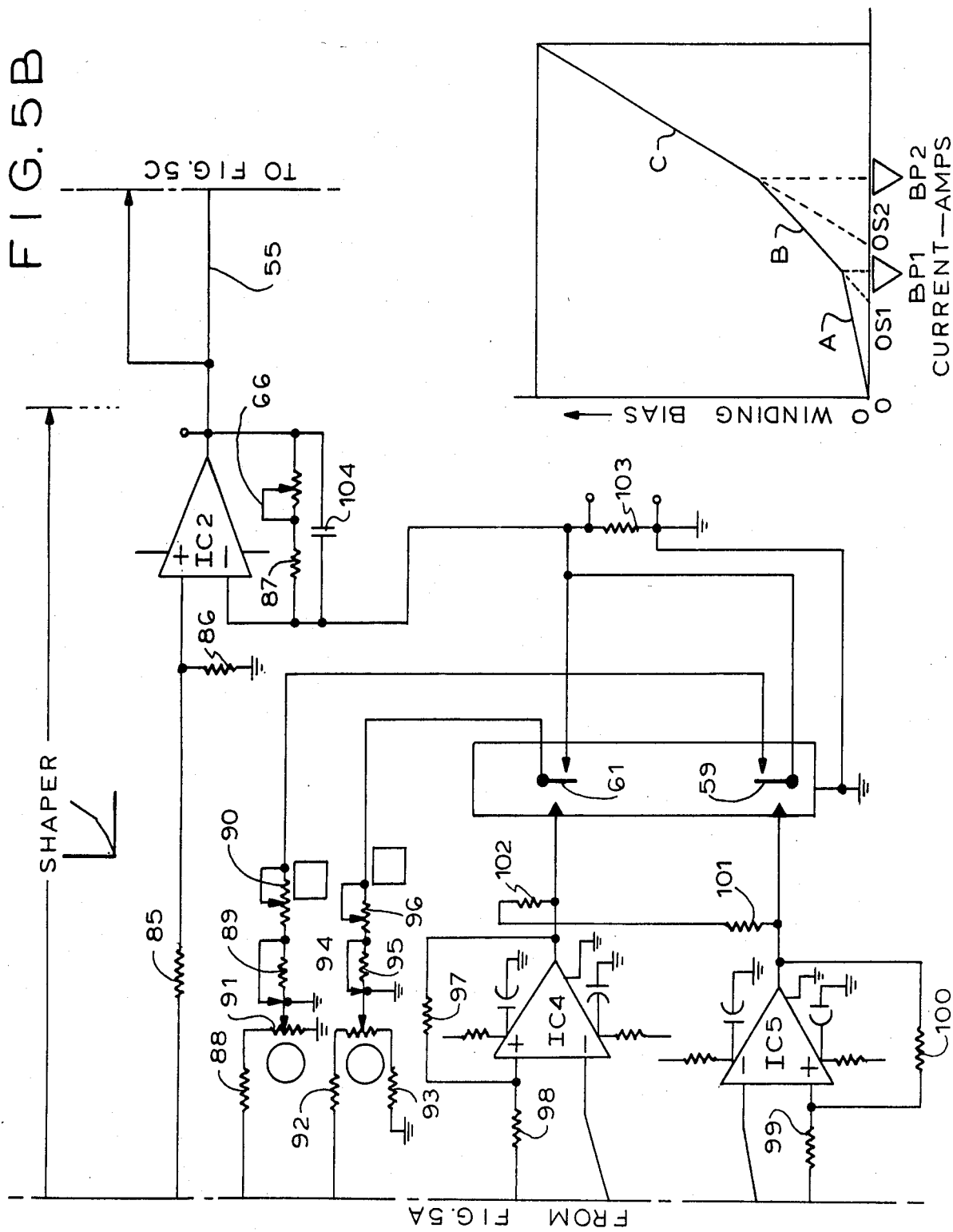

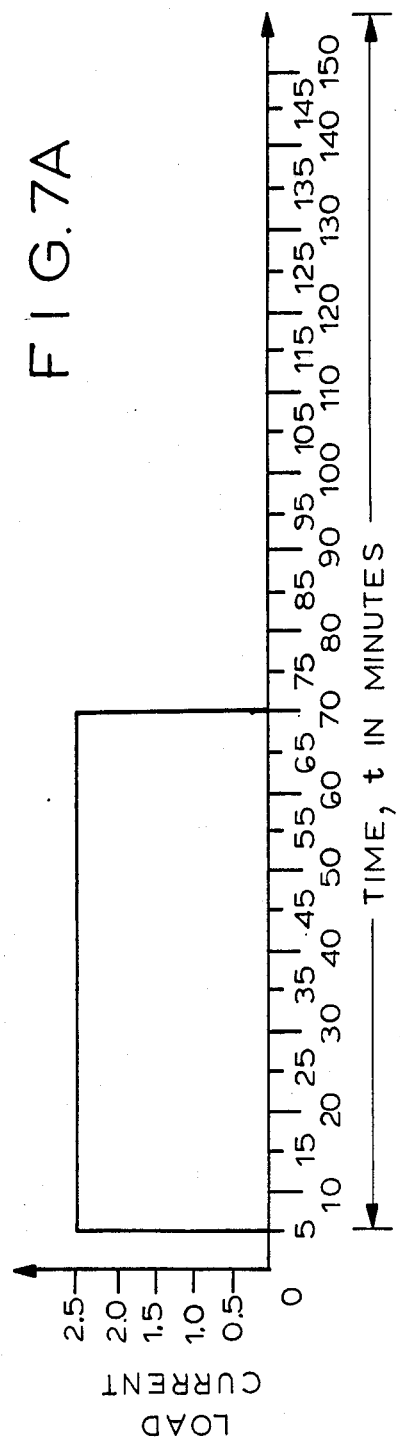
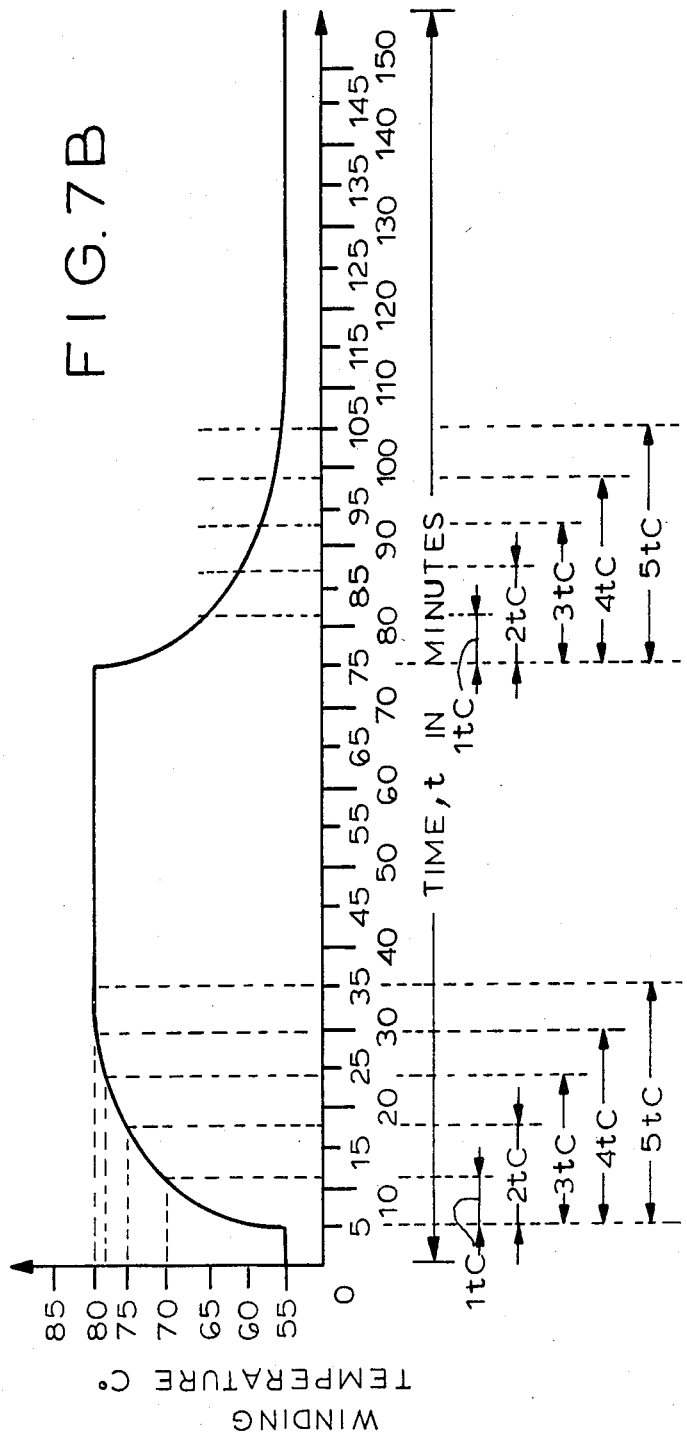

MODULAR ELECTRONIC TEMPERATURE CONTROLLER

BACKGROUND OF THE INVENTION

1. Field of Invention

This invention relates to a method and apparatus for indicating and controlling the temperature of power transformers of the type used by public utilities. This type of transformer typically has its transformer windings immersed in a liquid coolant. During operation of the power transformer it is important to know the temperature of the transformer winding, the maximum temperature it has reached, when cooling fans should be turned on and off and when power to the transformer should be turned off.

2. Discussion of Prior Art

It is known from prior systems to simulate the winding temperature by measuring the top oil temperature of the transformer and biasing the thermometer reading by an amount proportional to transformer load, or winding current, so as to indicate winding temperature. Such a system employs a thermometer with a sensing element measuring top oil temperature, a current transformer to provide a signal proportional to transformer load, a heater coil to provide the bias and an auto transformer to adjust the current supplied to the heater coil.

It is a object of this invention, rather than have a biasing heater to modulate the actual oil temperature in a transformer, to provide a method and apparatus to electronically determine the winding temperature based on the oil temperature in the transformer and the increased temperature that results from current flowing through the transformer winding.

It is a further object to provide an improved adjustable transformer temperature controller which may be adjusted or calibrated to provide a variable temperature increment to the oil temperature in accordance with the transformer manufacturers specification for temperature change at various transformer loads or winding currents.

SUMMARY

The invention aims to provide a new solution to the abovementioned problems, that is, a modular electronic temperature monitor and controller. Specific load current relationships can be calibrated for any class of power transformer. Transformer top oil temperature is continuously measured. A sample of transformer load current is also continuously measured. A mathematically weighted electronic analogy of transformer load current or the automatically selected highest load current is used to create a new quantity that represents instantaneous peak winding temperature rise due to load current. This peak temperature rise is then processed with a specific time constant such that the winding temperature rise is time-scaled to approximate actual winding temperature rise due to load current. The time-scaled winding temperature rise is then added to the top oil temperature analogy to accurately indicate simulated winding temperature. This winding temperature analogy is then used to operate switches that operate transformer cooling devices, shut offs, memory devices and alarms.

DESCRIPTION OF FIGURES

FIGS. 7A & B are waveforms of the time processed change-in-temperature signal.

DESCRIPTION

Because direct measurement of power transformer winding temperature is not economically feasible, means to simulate that temperature have been devised in the past.

Figure 1:
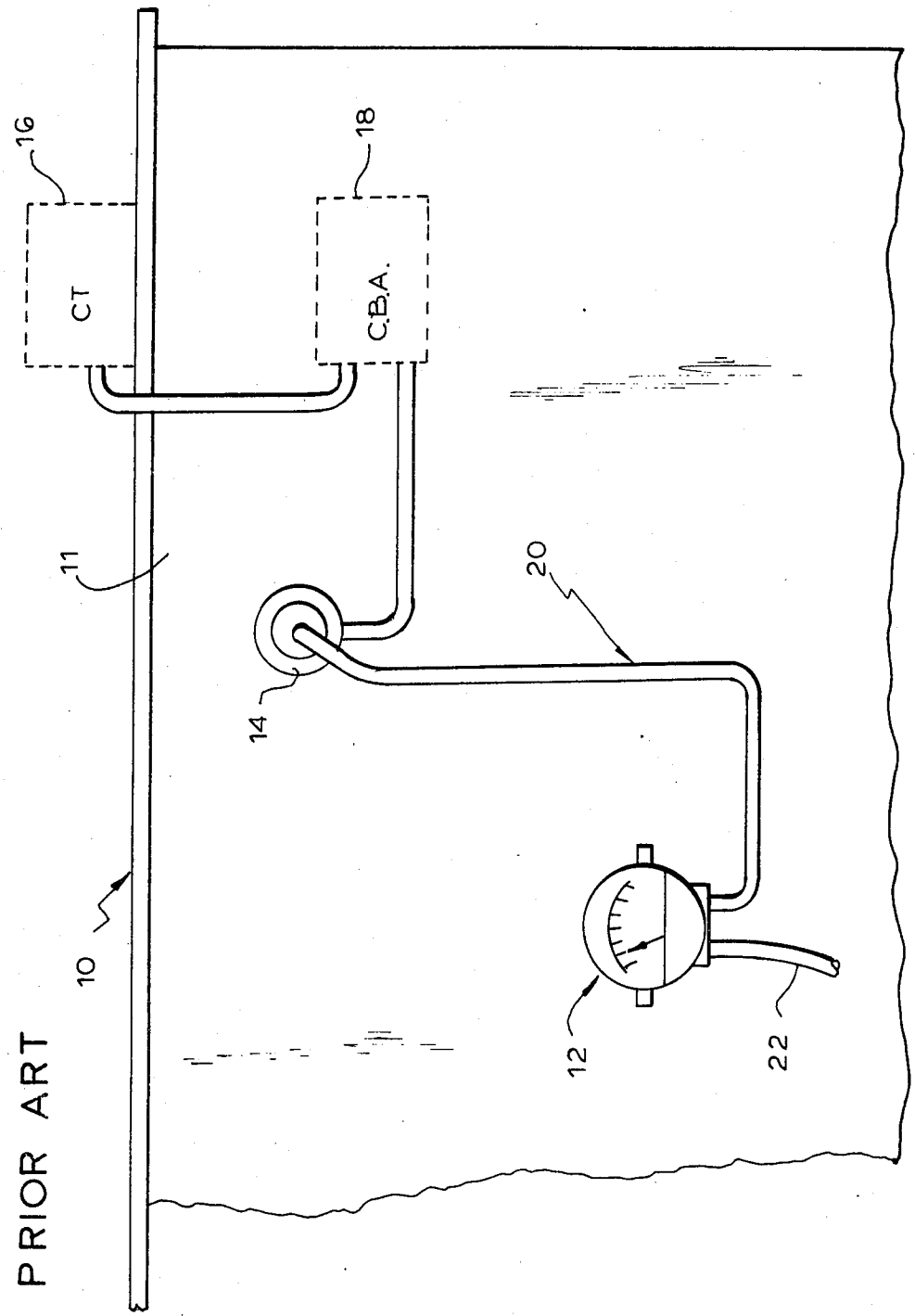
FIG. 1 is a representation of one form of a prior art winding temperature simulation system.

One such prior system is shown in FIG. 1 and uses a heater coil in the transformer oil to increase the temperature of the oil near the heat sensor, by an amount approximate that which would occur from the current in the transformer winding.

In FIG. 1 the power transformer 10 has oil 11, a thermometer indicator 12 whereby an observer may view the reading of the power transformer winding temperature. The heater coil and sensing element 14 is provided to generate the input signal to the thermometer indicator 12 via capillary element 20. The sensing element portion of the heater coil and sensing element 14 responds to the temperature of the transformer oil 11 near the sensor to provide the reading information to the thermometer 12. Alarm leads 22 control alarm apparatus, not shown. The heater coil 14 is controlled by the current transformer 16 which is normally available from the transformer manufacturer who additionally is aware of the various temperature differences which may be expected to result from different load currents i.e. winding currents. A current balancing autotransformer 18 responds to the current transformer 16 signal which is proportional to transformer load current and provides the heater coil 14 with the current to heat the oil near the sensor by an amount corresponding to that expected for a given load current. In this way it is seen that prior systems used a sensor to detect the top oil temperature, which was locally modified or biased by a heating coil responsive to transformer winding current.

Figure 2:
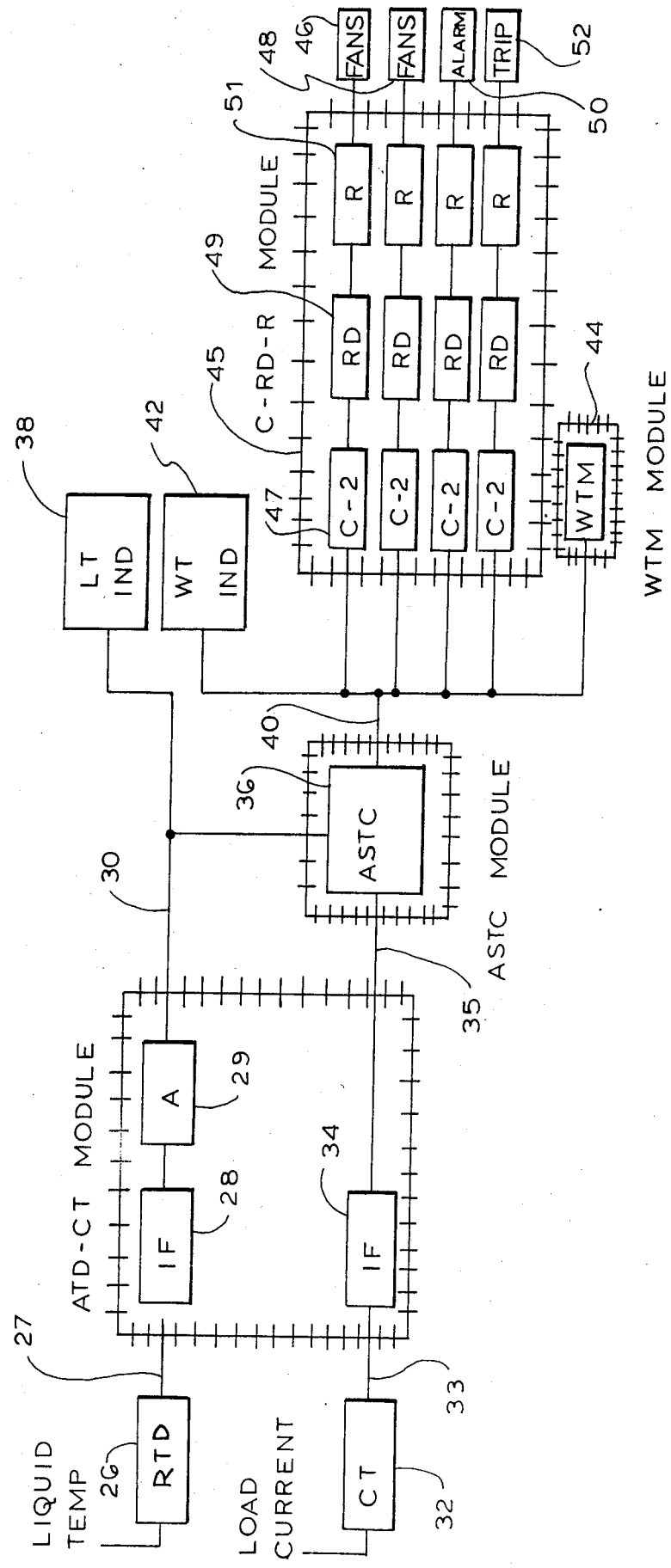
FIG. 2 is a schematic block diagram of the modular electronic temperature controller of this invention.

Turning now to the present invention, FIG. 2 is a schematic block diagram of the temperature controller. In essence, liquid oil temperature and the incremental temperature due to transformer winding current induced heating effect are added to generate a simulated winding temperature value which is used to indicate the winding temperature and control corrective apparatus such as fans, alarms, trips and winding temperature memory devices.

In a preferred embodiment of the invention, as shown in FIG. 2 a D.C. voltage from 0–5 volts is generated by circuitry responsive to a Resistance Temperature Detector (RTD) 26 and is applied via conductor 27 to the interface device 28 and from there to the D.C. amplifier 29 to conductor 30 which is the liquid temperature signal.

The current transformer 32 is connected via conductor 33 to the interface unit 34 and from there to the ADD-SHAPE TIME CONSTANT (ASTC) circuit 36 via conductor 35. The output of the interface unit 34 is a D.C. voltage from 0-5 volts which represents the present load current to be mathematically weighted, time processed and added to the top oil liquid temperature value to compute the simulated transformer winding temperature.

The ASTC circuitry 36 is later described more fully by reference to FIGS. 3 and 5A, B, C & D.

Continuing with the description of FIG. 2, the D.C. liquid temperature voltage appears on conductor 30 and directly drives the liquid temperature indicator 38 and is one of the two inputs to ASTC 36. The other ASTC input, load current, on conductor 35 is shaped, time processed, and added to the liquid temperature input. The output of ASTC 36 is the winding temperature voltage on conductor 40 which is used for several purposes.

The winding temperature voltage on conductor 40 is used to operate the winding temperature indicating meter 42, the maximum winding temperature memory 44, fans 46 and 48, alarm 50, and trip circuit 52.

Each of the output devices 46, 48, 50 and 52, located on the relays and comparators module 45, responds to the winding temperature voltage on conductor 40 to be activated. In each case a comparator 47, well known in the electronics art, compares the winding temperature signal with a preset winding temperature limit so that a relay driver 49 will activate a relay 51 upon the event of the conductor 40 winding temperature value exceeding the preset limit. Each comparator circuit has a preset differential that is a hysteresis, such that when a relay is activated (the set point is exceeded) the relay will remain activated until the winding temperature value drops below the set point by an amount equal to the hysteresis. Hysteresis for the fan circuits is normally set to 15° C., and for the alarm and trip circuits this value is 5° C. Exceeding the preset limit for fans 46 and 48 causes the fans to be activated. Exceeding the preset alarm limit activates the alarm 50 while exceeding the preset trip limit causes the trip 52 actuator to turn off power to the transformer. The winding temperature memory device 44 retains the value of the highest winding temperature noted during the time of interest, between times when it is manually reset. The memory device is a permanent, non-volatile memory.

Figure 3:
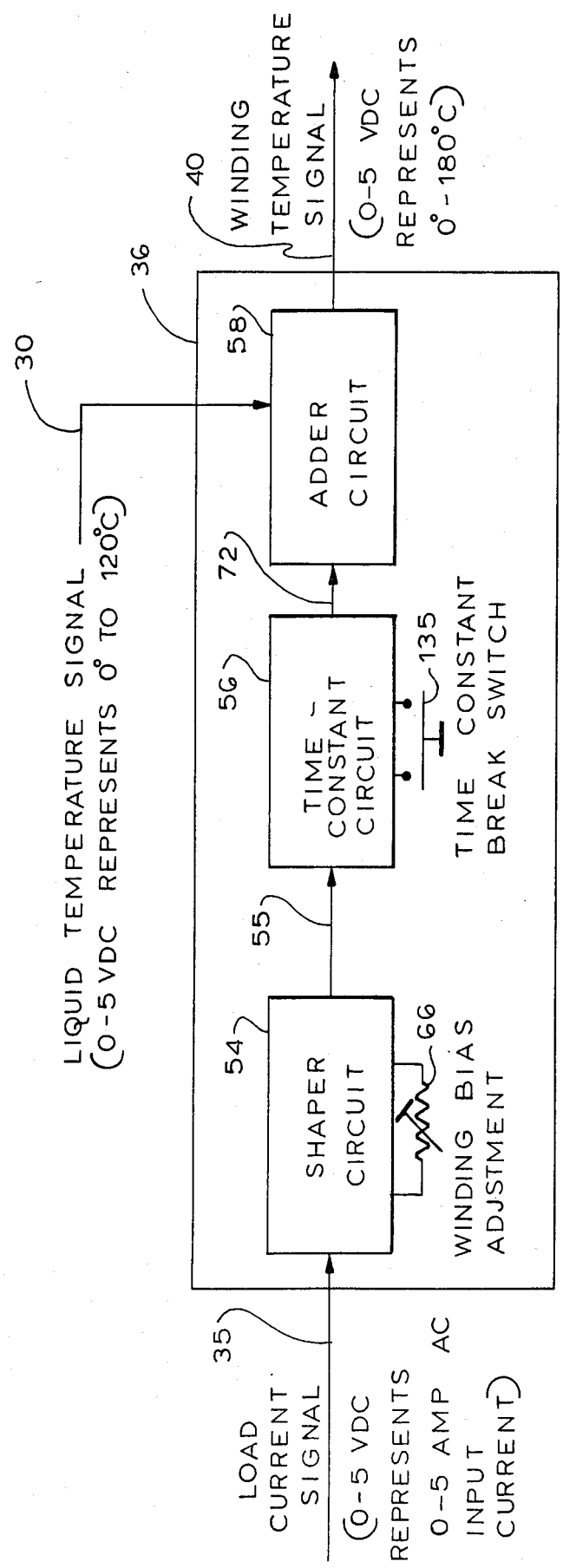
FIG. 3 is an expanded illustration of the schematic block diagram of the add-shape-time constant portion of FIG. 2.

FIG. 3 is a block diagram of the ADDER-SHAPER TIME CONSTANT (ASTC) circuit 36. In essence the ASTC circuit 36 takes the DC voltage signal on conductor 35 representing load current, shapes and time processes it in the shaper 54 and time constant circuit 56 and adds the resulting signal to the liquid temperature signal in the adder 58 to generate an output winding temperature signal on conductor 40, which is also shown at FIG. 2.

A characteristic of power transformers and their winding temperatures is that different transformers have different temperature characteristics. For each power transformer there will be a characteristic temperature curve which will show the change in temperature or incremental temperature variation T for various transformer winding currents.

Figure 4:
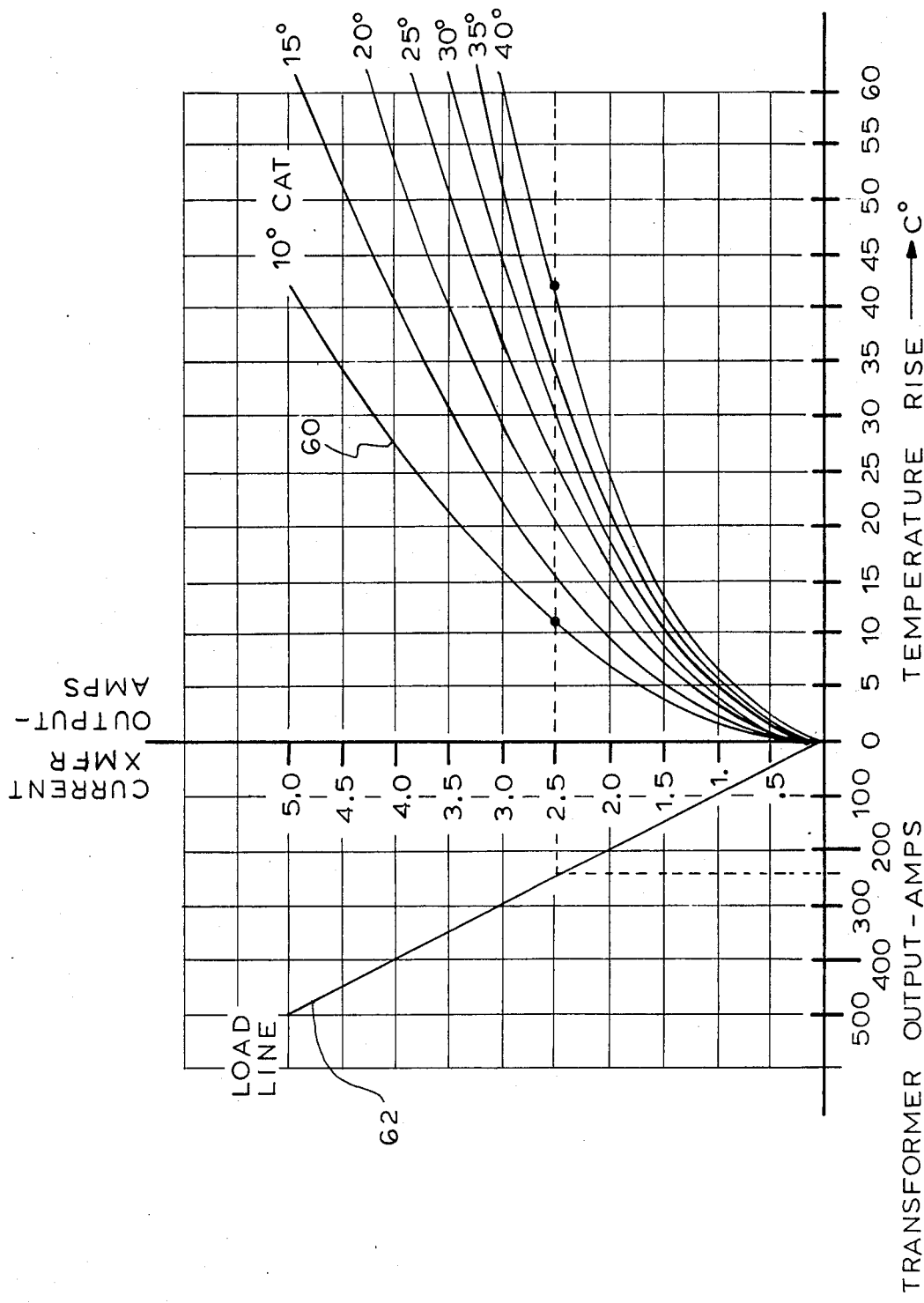
FIG. 4 is a representative family of curves for determining the differential temperature.
Figure 5C:
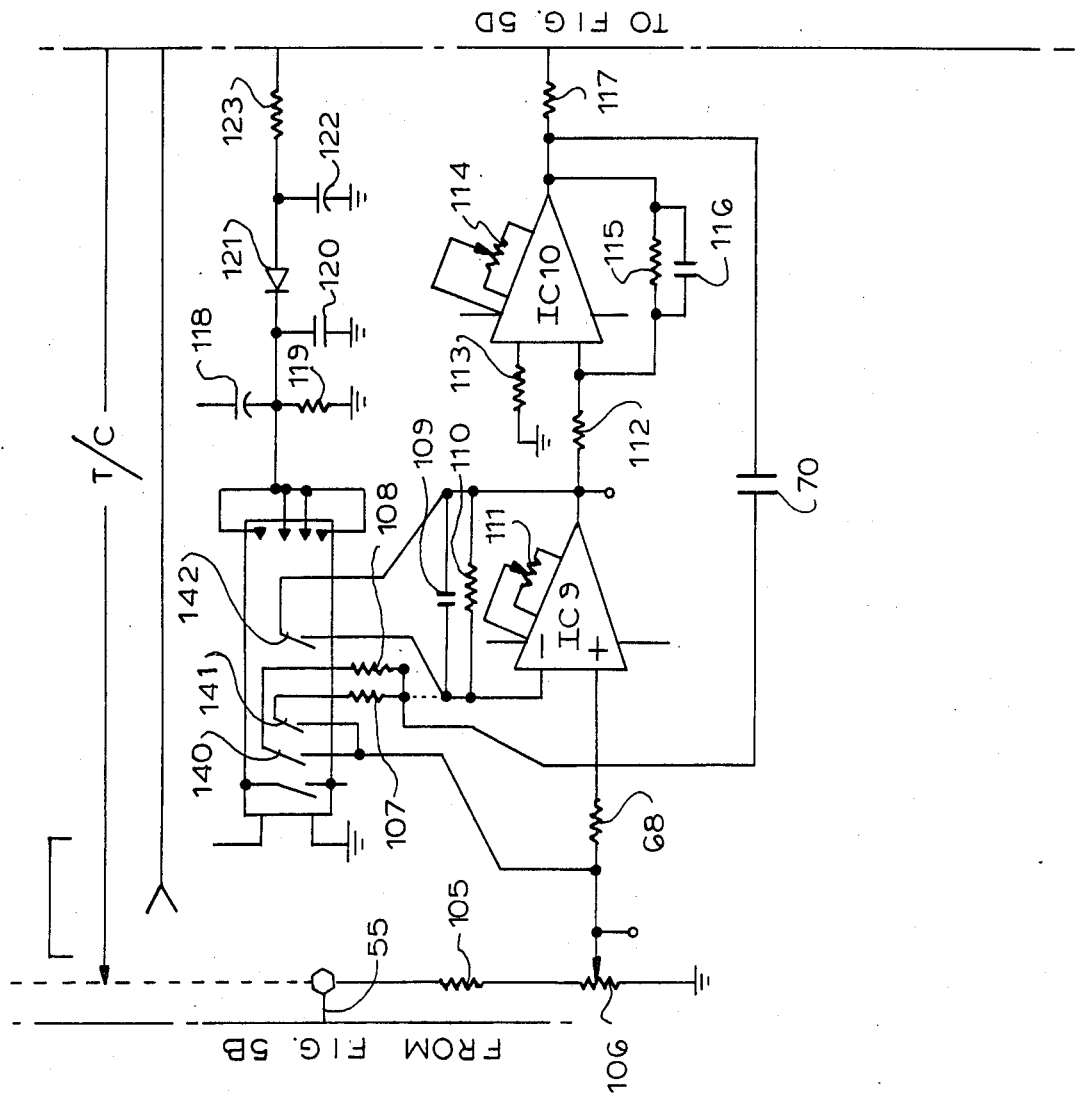
FIGS. 5A, B, C & D are schematic circuit diagrams for generating the liquid temperature and load current temperatures shown in FIG. 2.
Figure 5D:
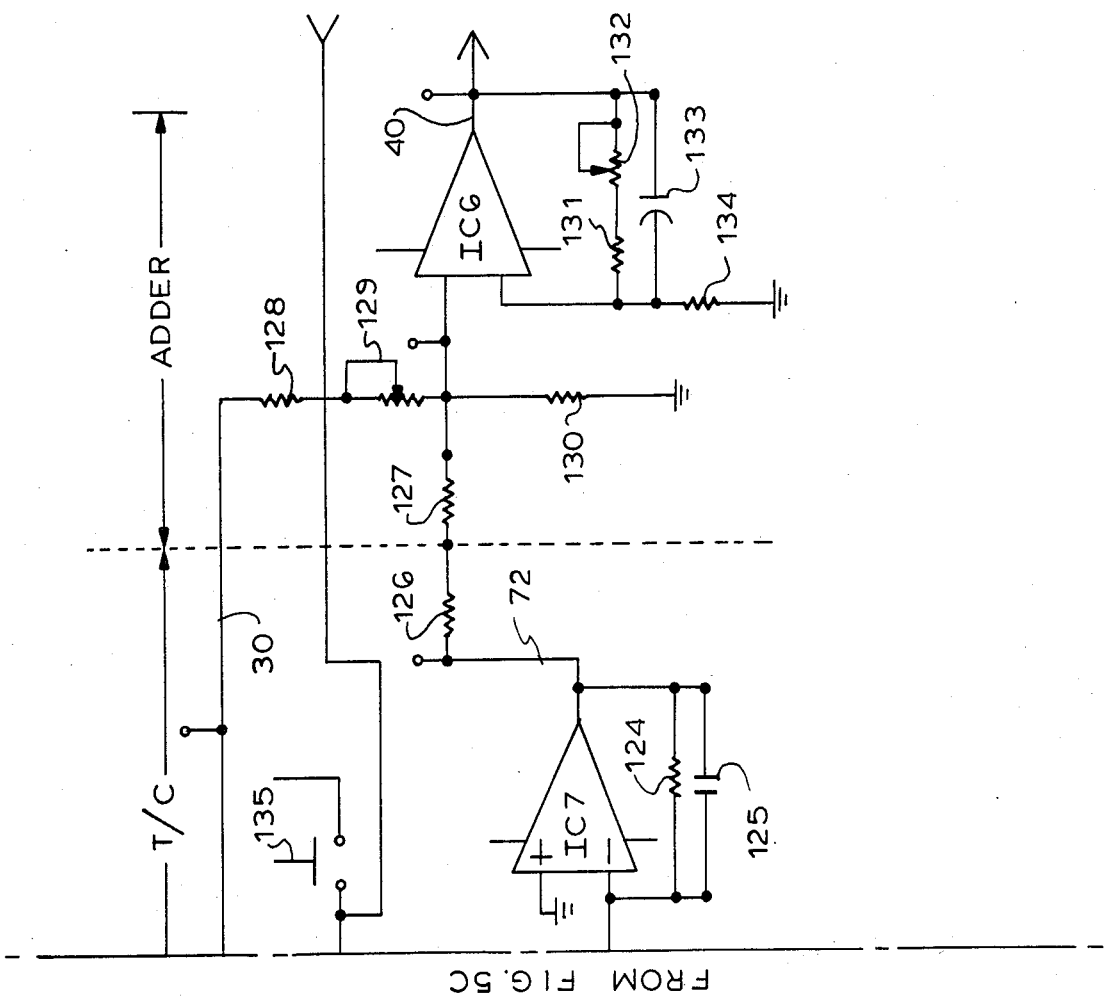

FIG. 4 illustrates a family of curves on the right-hand side wherein each curved line represents degrees C. temperature change in the transformer winding as a function of winding current. For example, for a transformer having an expected winding temperature change of 10° C. rise in winding temperature, line 60 applies. The left side of FIG. 4 illustrates how to choose a current transformer ratio such that the desired winding bias adjustment can be obtained for a given transformer. The winding bias 66 adjustment on the A.S.T.C. module provides a selectable range for winding bias of from 10° to 40° C. above top oil temperature at full load, that is 50% of current input, 2.5 amps. input. In the example, if a power transformer has 500 amperes through it, as shown on the abscissa, with a current transformer output of 5 amps, that is a 500:5 ratio current transformer a load line may be drawn as shown by line 62. In this example, as may be seen from the construction lines, when the transformer is operating at 250 amps, there will be a current transformer output of 2.5 amps which represents an increase over the liquid temperature of 10° if the transformer has a characteristic as illustrated by the 10° C. ΔT curve 60. Because the time constant circuits holds back the winding bias connection for five time constants, a time-constant break switch 135 is provided to temporarily eliminate the time constant. As long as the T/C break switch 135 is depressed, any input current that creates a winding bias signal will be felt immediately on the winding temperature 40. One of the important features of this invention is the ability of the ASTC to be calibrated to generate an accurate winding temperature indication for each of several power transformers, and the time constant response provides a realistic increase or decrease of the indicated load current heating effect. Turning now to FIG. 5, the operation of the ADD-SHAPE-TIME CONSTANT (ASTC) circuit 36 will be described in some detail. The ASTC 36 appears in block diagram form in FIGS. 2 and 3 and in schematic circuit form in FIGS. 5A, B, C & D.

Figure 6:
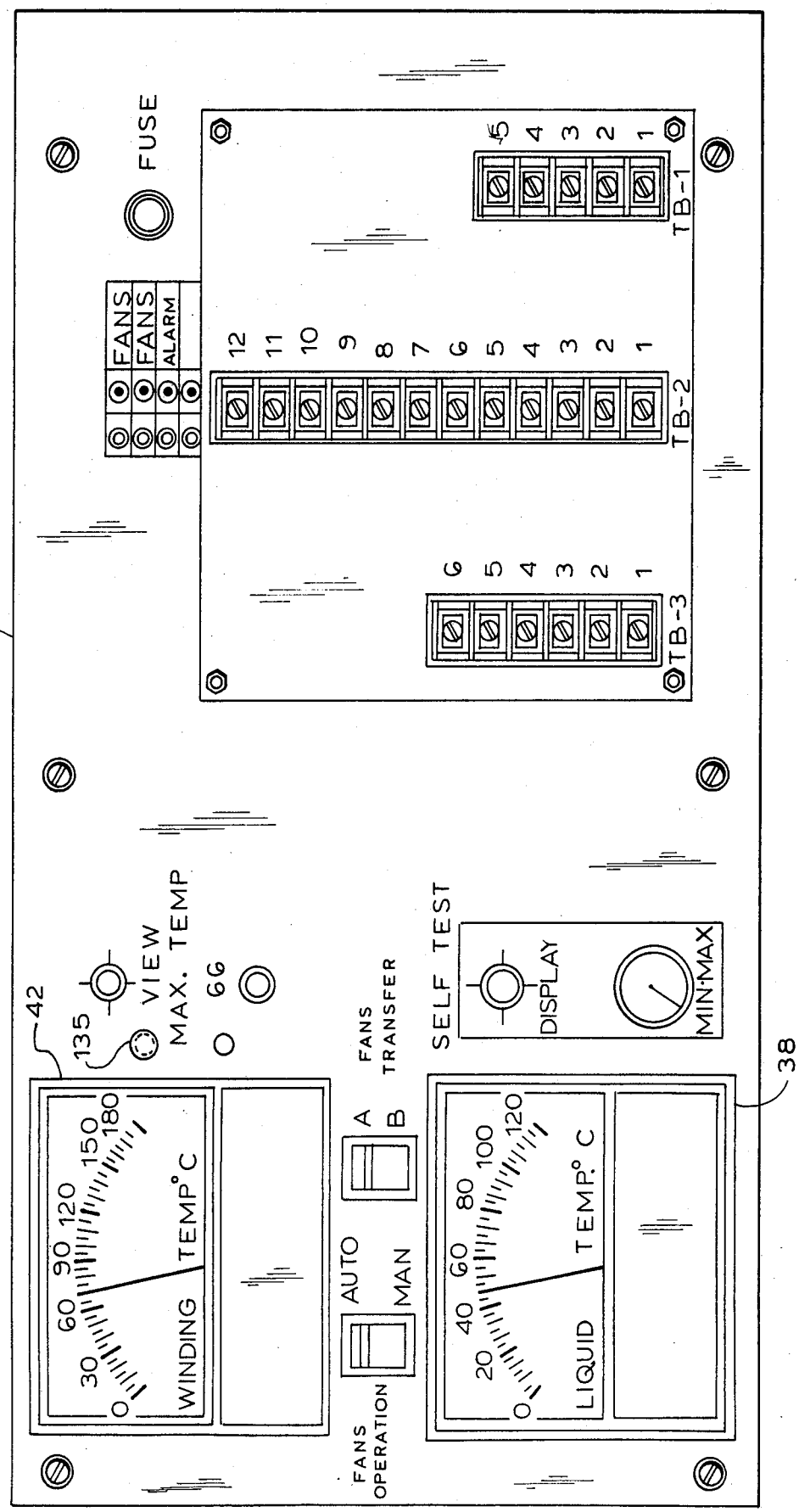
FIG. 6 is a front view of the control panel of the modular electronic temperature controller.

The ASTC module 36 accepts the liquid temperature signal 0 to 5 V D.C., representing 0° to 120° C. of top oil liquid temperature on conductor 30, and the load current signal 0-5 V D.C. representing 0-5 amps AC, at conductor 35, and uses these values to create winding temperature correction factors which are time response controlled by the time constant circuit 56. The time response controlled winding temperature correction factor is then added to the liquid temperature signal to generate the winding temperature. This temperature is displayed by the front panel winding temperature meter 42 of FIGS. 2 and 6. The winding temperature signal is also made available to the relay-comparator module 45 for the operation of output relays 51 as their temperature set points are reached.

The ASTC 36 comprises three main functional blocks; shaper circuit 54, time constant circuit 56 and adder circuit 58. As shown in FIGS. 5A and 5B the shaper circuit 54 accepts the load current signal on conductor 35 and utilizes a series of straight line segments to approximate the desired winding bias/input current relationship. The magnitude of load induced temperature correction (ΔT) is determined by a winding bias adjustment potentiometer 66. As an example; with a load current signal of 2.5 V D.C., corresponding to an input current of 2.5 amps A.C., the winding bias adjustment can be set to any bias value from +10° to 40° C. above the liquid temperature. This means that the winding temperature may become larger than the top oil temperature by any value from 10° to 40° C. at 2.5 amps input current. It is this range of adjustment that creates the family of curves that are available, as shown in FIG. 4. The output of the shaping circuit 54 appears on conductor 55 at FIGS. 5B & C.

The shaper circuits of 5A and 5B create the winding bias Vs. load current curve using three straight line segments to approximate a smooth curve.

The first segment, A begins at the origin and proceeds with a very shallow slope, to breakpoint BP1. The slope of A is determined by the divider action of resistors 86 and 85 and the multiplier effect of the voltage gain of stage IC2. This voltage gain is set by 1 plus the ratio of the sum of resistors 66 and 87 divided by resistor 103.

The second segment B is operational as long as the input current is within the range of values between breakpoints BP1 and BP2. Breakpoint BP1 is determined by the setting of potentiometer 82. When the input current signal 35 exceeds the setting of 82, 1.85 volts, comparator IC5 is activated and in turn closes switch 59. With switch 59 closed the network comprised of resistors 88, 89, 90 and 91 is now attached across resistor 103.

The new network applied in parallel with resistor 103 creates an offset or zero shift for amplifier IC2 and also increases the voltage gain. This means that as long as the input current is within the range between BP1 and BP2, the response at conductor 55 will be as shown in segment B. In this region the offset for B is calibrated by the setting of resistor 91 and the gain of the stage controlled by adjusting resistor 90 for the setting such that the resistor 103 in parallel with the network has the slope, which is the voltage gain required for segment B.

The last segment, C is reached when the input current signal exceeds the value of breakpoint BP2, which is determined by potentiometer 81. This setpoint is 3.55 volts. When the current signal 35 exceeds 3.55 volts, comparator IC4 activates and closes switch 61. With switch 61 closed, the network of resistors 92, 93, 94, 95 and 96 is connected in parallel with resistor 103 and the network for segment B. The offset for C is determined by setting potentiometer 94. The slope, that is the voltage gain for C, is adjusted by potentiometer 96.

The time constant function is accomplished by amplifier stages IC7, IC9 and IC10 and with switches 140, 141 and 142. The series circuit formed by resistor 68 and capacitor 70 is a simple R-C low pass filter circuit. However, the effective value of capacitance 70 is enlarged by a factor of 100 by the voltage gain of a capacitance multiplier circuit IC9 and IC10. The time constant of an R.C. low pass filter is the product of resistance times capacitance. Using the capacitance multiplier to multiply capacitance 70 by a factor of 100 makes the time constant equal to 100 times resistor 68 times capacitor 70. Example:

Resistor 68 is 200,000 Ohms
    Capacitor 70 is 20 micro farads
    Multiplication factor is 100

The time constant is therefore:

$$(2 \times 10^5 \text{ ohms}) (2 \times 10^{-5} \text{ farads}) (100) = 400 \text{ seconds}$$

Therefore the full response time is five time constants which is 2000 seconds. This can be seen in the leading and trailing edge of the waveform of FIG. 7B.

When the winding bias approximation is generated, it is applied to the time constant circuits 56 for processing. The time constant response is produced by a resitor-capacitor RC low pass filter circuit in which the value of capacitance 70 is multiplied by a factor of 100 by the capacitance multiplier circuit. One arrangement is for the ASTC time constant to be preset to 400 seconds. Referring to FIG. 5C, any desired time-constant can be chosen by simply changing the resistance 68, the capacitor 70 and/or the multiplier factor (100). The time-constant value (400 sec) is the basis of the time response but not the time response itself. The total response time is equal to five time-constants. For example, if the time-constant is set to six minutes, the total response time will be thirty minutes. The winding temperature signal increases or decreases smoothly in response to load current changes because the response of an RC low-pass filter is an exponential function. FIG. 7 illustrates the exponential response of the time-constant circuit to step changes of load current and describes a system with its winding bias set for a 25° C. rise for load current at 2.5 amps. AC, and the example system has a time-constant set at six minutes. This means that the overall response time for step changes in load current will be five times six or thirty minutes.

FIG. 7A is a graph of load current versus time. Load current is zero at time=0. At time,=5 min., load current steps up to 2.5 amps, where it remains for sixty five minutes. At seventy minutes the load current again drops to zero where it remains.

FIG. 7B is a graph of winding temperature versus time. At time=0, the winding temperature is 55° C., that is, with no load current, winding temperature equals liquid temperature equals 55° C. At time=5 min., the winding temperature signal begins changing exponentially toward the ultimate end point temperature of eighty degrees centigrade. The exponential response gives rise to the smooth slopes of the leading and trailing edges of this waveform. The effect of the time-constant can be seen in FIG. 7B. The winding temperature begins to rise at time=5 min. After the first time-constant (six minutes later) the value has risen to sixty-three percent of the required peak. That is, at time=11 min. winding temperature equals 55°+0.63×25°=70.75°. The expression for winding temperature during the period of increased load current can be written as $$WT = To + (T1 - To)(1 - E^{-t/T.C.})$$

where
    WT = Winding Temperature
    TO = Starting Winding Temperature
    T1 = Final Winding Temperature
    E = 2.718
    t = Elapsed time from start of load current pulse
    TC = Time constant (six minutes in this example)

Example: At time=TO+2TC=5+12=17 min. winding temperature is:

$$\begin{aligned} WT &= 55° \text{ C.} + 25(1 - E^{-12/6}) \\ &= 55° + 25(1 - E^{-2}) \\ &= 55° + 25(.86) \\ &= 76.62° \text{ C.} \end{aligned}$$

In 2 time-constants, the response is at 86% of the total required, and a full five time-constants (30 min) are required for the complete load current induced winding temperature change to be present in the winding temperature signal. The signal on conductor 72 therefor represents the winding temperature increment due to load current, time processed to simulate the actual heating effect which occurs in the actual system.

The adder circuit 58 is the last ASTC function. This circuit adds the liquid temperature signal on conductor 30 to the timed winding bias signal on conductor 72 to create the winding temperature signal on conductor 40. The winding temperature signal is the final result of all the ASTC signal processing operations. This signal is displayed on the front panel 37 Winding Temperature meter 42 and is made available to the relays-comparators module 45 and also to the MAX Temp memory 44. The relays comparators module 45 will operate its relays 51 for transformer protection and heat management when the setpoints for the output relays are exceeded by winding temperature. The Max Temp memory module 44 permanently records the highest winding temperature reached.

Alternative to the use of two indicator meters one option is to use one indicator meter and switch the input from the liquid oil temperature indication to the winding temperature indication. Whichever system is used, winding temperature will be indicated or used to control corrective apparatus.

A feature of the invention is the fact that all of the circuits involved may be arranged in modular form for ease of testing and maintenance of the system.

It should be understood that the initial load current signal may be obtained from the current transformer normally provided by the manufacturers of the power transformer.

In addition the initial liquid temperature signal may be obtained from a Resistance Temperature Detector such as described in the Transducer Interfacing Handbook edited by Daniel H. Sheingold pp 2-5, 10 and 11.

It should be understood that the computations and signal representations may be in any one of several forms or parameters. The parameter utilized in the preferred embodiment is D.C. voltage and the description here is based on that parameter.

It is of course understood that variations may be made without departing from the invention. However, for completeness there follows a table of component values used in the preferred embodiment:

| | |
|---|---|
| 66 - 50K ohm | 85 - 9.53K ohm |
| 68 - 200K ohm | 86 - 499 ohm |
| 70 - 20 micro farad | 87 - 10K ohm |
| 74 - 1 Meg ohm | 88 - 2K ohm |
| 75 - 150 micro farad | 89 - Jumper |
| 76 - 750 ohm | 90 - 10K ohm |
| 77 - 4.99K ohm | 91 - 50 ohm |
| 78 - TL431 Regulator - T.I. | 92 - 1.5K ohm |
| 79 - 4.99K ohm | 93 - 30.1 ohm |
| 80 - 4.99 ohm | 94 - 50 ohm |
| 81 - 1K ohm | 95 - Jumper |
| 82 - 1K ohm | 96 - 10K ohm |
| 83 - 1K ohm | 97 - 1 M ohm |
| 84 - 0.1 micro farad | 98 - 4.99K ohm |
| 99 - 4.99K ohm | 117 - 1K ohm |
| 100 - 1 M ohm | 118 - 33 micro farad |
| 101 - 3.01K ohm | 119 - 100K ohm |
| 102 - 3.01K ohm | 120 - 0.1 micro farad |
| 103 - 10K ohm | 121 - Diode IN914B |
| 104 - 0.1 micro farad | 122 - 4.7 micro farad |
| 105 - 2K ohm | 123 - 2.2K ohm |
| 106 - 50 ohm | 124 - 1K ohm |
| 107 - 330 ohm | 125 - 0.1 micro farad |
| 108 - 330 ohm | 126 - Jumper |
| 109 - 0.1 micro farad | 127 - 7.5K ohm |
| 110 - 200K ohm | 128 - 15K ohm |
| 111 - 20K ohm | 129 - 20K ohm |
| 112 - 1K ohm | 130 - 1K ohm, |

-continued

| | |
|---|---|
| 113 - 1K ohm | 131 - 10K ohm, |
| 114 - 20K ohm | 132 - 20K ohm |
| 115 - 100K ohm | 133 - 4.7 micro farad |
| 116 - 0.1 micro farad | 134 - 1K ohm |
| IC1 Operational Amplifier OP-07 | IC4 Comparator LM 311 |
| IC2 Operational Amplifier OP-07 | IC5 Comparator LM 311 |
| IC6 Operational Amplifier OP-07 | |
| IC7 Operational Amplifier OP-07 | |
| IC9 Operational Amplifier OP-07 | |
| IC10 Operational Amplifier OP-07 | |

The Modular Electronic Temperature Controller allows separate calibration of important parameters for Winding Temperature Simulations. The input current range, winding bias setpoint and time-constant can be chosen independently so that any electric power transformer can be simulated more precisely than previously.

What is claimed is:

1. The method of generating a parameter representative of the temperature of a power transformer winding immersed in a fluid, comprising the steps of;

measuring the temperature of the fluid, generating a parameter proportional to the fluid temperature measurement, measuring the amount of current passing through the transformer winding, generating a parameter proportional to the change of winding temperature expected to result from the measured current passing through the transformer winding by calibrating a circuit to electronically provide the proportional parameter, providing a time constant response to the change of winding temperature parameter, and adding the parameters representative of fluid temperature and expected change of temperature resulting from the current passing through the transformer winding, to obtain a parameter representative of the winding temperature of the power transformer.

2. The method of claim 1 in which the parameter is DC voltage.

3. The method of claim 1 further comprising the step of applying the resulting winding temperature parameter to an indicator to indicate the power transformer winding temperature.

4. The method of claim 3 in which the parameter is DC voltage.

5. The method of representing the winding temperature of a power transformer immersed in a fluid comprising the steps of;

measuring the temperature of the fluid, generating a parameter proportional to the fluid temperature measurement, establishing the temperature differential characteristic curve of the power transformer winding for different amounts of current flowing through the winding, measuring the amount of current passing through the transformer winding, adjusting a variable circuit to generate a parameter representative of the temperature differential for the measured current, including a time constant for accurate modeling of temperature changes, and adding the parameters representative of the fluid temperature and the temperature differential to obtain a parameter representative of the winding temperature of the power transformer.

6. The method of claim 5 in which the parameter is DC voltage.

7. The method of claim 5 further comprising the step of applying the resulting winding temperature parameter to an indicator to indicate the power transformer winding temperature.

8. The method of claim 7 in which the parameter is DC voltage.

9. A temperature control and warning system for liquid-filled electric power transformers which normally have a load current flowing through their windings, comprising, means for generating an electric signal representative of the temperature of the liquid in the transformer, means, including adjustable electronic circuitry, for generating an electric signal representative of a change in winding temperature due to the load current flowing through the transformer winding, shaping means for modifying the change-in-winding-temperature signal in accordance with the characteristics of the particular transformer, time processing means for time processing the shaped change-in-winding temperature signal to simulate the time which normally occurs between the time current flows through a winding until the winding heats up, adding means responsive to the said liquid temperature signal and the shaped and time processed change-in-temperature signal to generate a winding temperature signal proportional to and representative of the winding temperature.

10. The apparatus of claim 9, further comprising indicating means for indicating the winding temperature and temperature control means for reducing the temperature of the transformer liquid when the temperature exceeds a preset amount.

11. Apparatus for monitoring the temperature condition in a high voltage transformer having a transformer winding immersed in a liquid comprising, means for measuring the temperature of the liquid, means for generating a voltage representative of the measured liquid temperature, first indicating means for indicating the measured liquid temperature, means for measuring the electrical current passing through the transformer winding, means, including circuitry calibrated to represent a characteristic of the transformer, for generating a voltage representative of the measured winding current and temperature differential resulting from said winding current, means for shaping the representative winding current voltage in accordance with the characteristics of the transformer winding, time constant means for time processing the shaped winding current voltage to simulate the time differential associated with the time between change in current and the resulting temperature change in the winding, the output of the time constant means representing the temperature differential resulting from transformer current, adder circuit means responsive to the outputs of the measured liquid temperature means and time constant means for generating a voltage representative of the winding temperature as represented by the sum of the liquid temperature and the said temperature differential, second indicating means for indicating the winding temperature, fan means for cooling the transformer, first comparator means for responding to a high winding temperature condition to activate said fan means, alarm means for indicating an excessive winding temperature, second comparator means responsive to a preset winding temperature limit to activate said alarm means upon the existance of an excessive winding temperature, winding temperature memory means responsive to the time constant delay means for retaining the highest winding temperature indicated during the time period of interest, trip means arranged to disconnect the high voltage transformer from its power source upon the transformer winding temperature reaching a preset trip value, and comparator means interconnecting the trip means and the winding temperature voltage from the time constant delay means whereby power to the high voltage transformer is disconnected upon the winding temperature voltage reaching a predetermined amount.

* * * * *